Jan. 10, 1967   C. A. YOUNGMAN   3,296,776
APPARATUS FOR SEPARATING GASES FROM LIQUIDS
Filed Oct. 30, 1964   2 Sheets-Sheet 1

INVENTOR.
Carl A. Youngman
BY
Attorney

INVENTOR.
Carl A. Youngman

BY *Blucher S Tharp*

Attorney

United States Patent Office 3,296,776
Patented Jan. 10, 1967

3,296,776
APPARATUS FOR SEPARATING GASES FROM LIQUIDS
Carl A. Youngman, Dallas, Tex., assignor to The Atlantic Refining Company, Philadelphia, Pa., a corporation of Pennsylvania
Filed Oct. 30, 1964, Ser. No. 407,747
6 Claims. (Cl. 55—165)

This invention relates to apparatus which function to separate gases from liquids. More particularly, the invention concerns gas separators used for hydrocarbon seep detection.

It has recently been determined that water-covered areas can be investigated for the location of petroleum deposits by detecting the presence of hydrocarbon gases in the water. In this type of investigation, gaseous components present in test samples are separated and analyzed to determine whether they contain gaseous hydrocarbons indicative of oil deposits.

Various types of separators have been proposed for removing gaseous hydrocarbons from water. These separators or "breakout chambers" generally consist of a container fitted with a gas-water inlet means, a gas outlet means, a water outlet means, and means for controlling water level within the chamber. A water pump is usually connected to the water outlet means to withdraw degassed water from the separator. The gas-water inlet means is preferably located above the surface of the water so that gas is dissociated from water as the gas-water mixture is forced in the separator. To aid in this process, the container is usually kept under reduced pressure by means of a vacuum line connected to the gas outlet means. Generally, water level within the container is maintained at a preselected level by means of a float or like mechanism which works a flow control valve.

The present invention comprises a new and improved apparatus for separating gases from liquids and was specially designed and constructed to accomplish the following objects:

To provide a gas separator which is trouble-free in operation, simple, compact, and highly efficient.

To provide a gas separator having a new and simplified means for maintaining the desired level of water within the separator.

To provide a gas separator wherein the water level control means acts to adjust the flow entering the separator from the gas-water inlet means.

To provide a gas separator having a rotatable sleeve value member adapted to fit around the gas-water inlet means and support a float member which sleeve valve means is rotated by the action of water entering the separator.

To provide a gas separator wherein the water level control means consists of a float member which determines proper water level and a sleeve valve member which supports the float member and acts to open and close the gas-water inlet means in response to movements of the float member.

These objects and others which will become apparent to those skilled in the art have been accomplished in the invention of the gas separator as hereafter described in the specification and the accompanying drawings wherein.

Figure 1:
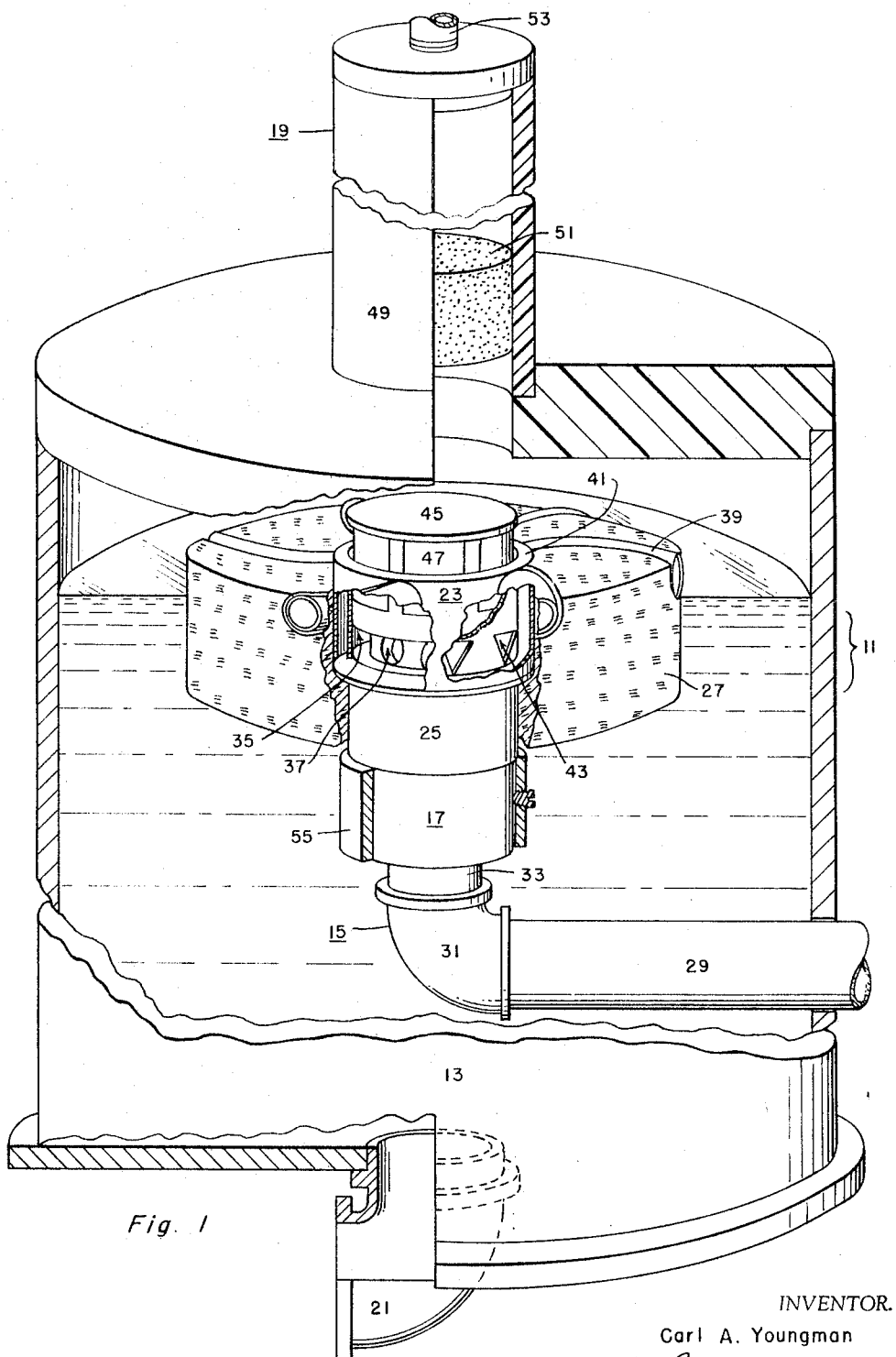
FIGURE 1 is a broken-out sectional view of the assembled gas separator showing the gas-water inlet means, the water-level control means, the gas outlet means, the water-outlet means, and the breakout chamber.

Referring specifically to FIGURE 1, there is shown gas separator 11 which is composed of cylindrical container or housing 13; gas-water inlet means 15, which includes standpipe valve means 17; gas outlet means 19; water outlet means 21; and water-level control means 23, which consists of sleeve valve member 25 and float member 27.

Water with dissolved gas is introduced to gas separator 11 via inlet pipe 29 which is part of gas-water inlet means 15. Pipe 29 passes through container 13 and joins with right angle joint 31 which in turn rigidly connects with standpipe valve member 17 through connector 33. It is important that standpipe valve member 17 be arranged so that it will be substantially vertical with respect to the earth in operation.

Figure 2:
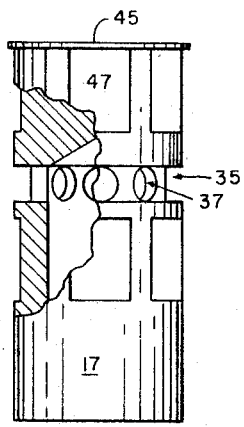
FIGURE 2 is a broken-out perspective view showing the standpipe valve member of the gas-water inlet means.

Referring now to FIGURES 1 and 2, it can be seen that standpipe valve member 17 has encircling groove 35 with ports 37 formed therein. The function of ports 37 is to provide for passage of water and gas from the interior of standpipe valve member 17 to groove 35. Groove 35 should occupy a plane substantially perpendicular to standpipe valve member 17.

Figure 3:
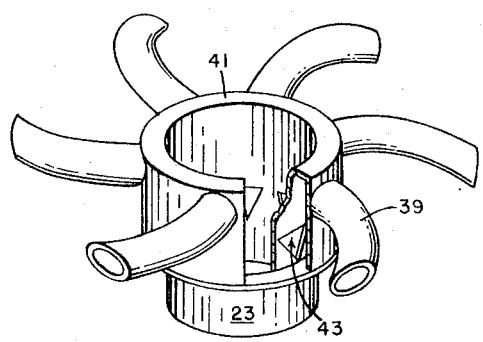
FIGURE 3 is a broken-out perspective view showing the rotatable sleeve valve member which comprises part of the water level control means.

Referring now to FIGURES 1 and 3, one sees sleeve valve member 23, which is supported by standpipe valve member 17. Sleeve valve member 23 has tubular members 39 radially extending from the outer wall of body member 41. Interface openings 43 are cut in the interior wall of body member 41. When interface openings 43 register with groove 35, the gas-water mixture passes from standpipe valve member 17 through the hollow interior of sleeve valve member 23 to tubular members 39. Preferably, interface openings 43 are triangular-shaped and have their apexes pointed downward. As will be explained later, this feature provides a means for "built-in" flow control.

Now further considering FIGURES 1 and 2, there is seen rim or stop member 45 located on the upper end of standpipe valve member 17 which acts to retain sleeve valve member 23. When sleeve valve member 23 rides against stop member 45, it is important that interface openings 43 do not register with groove 35, i.e., the water-gas mixture should not be able to pass from groove 35 to tubular members 39. This is accomplished by closing or blocking groove 35 with the solid area of body member 41 found below interface openings 43. Another feature of this invention involves the use of beveled edges 47 on the outer surface of standpipe valve member 17. This reduces frictional drag and provides for smooth operation as sleeve member 23 moves about standpipe valve member 17. Also, adverse effects of foreign particles present in the water are minimized. Stop member 55, which is formed as a sleeve about standpipe valve member 17, prevents sleeve valve member 23 from dropping below a predetermined level on standpipe valve member 17. Stop member 55 should be positioned such that interface openings 43 will fully register with groove 35 when the water level is below or equals the preselected operating level.

Further considering FIGURE 1, it is seen that float member 27 fits about sleeve valve member 23 such that tubes 39 are supported above the surface of the water. Float member 27 may be composed of any material buoyant with respect to water, such as cork, foamed plastic, and the like. Gas entering separator 11 through standpipe valve member 17 and sleeve valve member 23 collects in top portion of container 13 while water separates and forms in lower portion. The collected gas is withdrawn through gas outlet means 19. Condensing chamber 49 which is part of gas outlet means 19 provides a surface on which water vapor present in the gas can condense and also prevents spray and foam carry-over.

A filter, such as plate 51, is preferably placed in condensing chamber 49 to further prevent foam carry-over. Plate 51, for example, may be composed of silicone treated polyurethane. After passing from condensing chamber 49, the gas passes through outlet pipe 53 to an analyzer system (not shown). Generally, a vacuum pump (not shown) is connected to gas outlet pipe 53 to aid in the separation process. The degassed water passes out water outlet means 21 under the influence of a water pump (not shown). To simplify assembly and maintenance, container 13 is constructed so that its top portion is removable. In the described embodiment the sides and bottom portion of container 11 were formed as an integral unit and constructed of stainless steel; the severable top portion was constructed of plastic, i.e., Lucite.

In operation, the gas separator described above functions as follows:

Water is pumped into container 13 until groove 35 aligns with interface openings 43. As the gas-water mixture is introduced through pipe 29 to standpipe valve member 17, it passes through ports 37 to groove 35 and, then, through interface openings 43 to tubular members 39. Ejection of the gas-water mixture from tubular members 39 causes sleeve valve member 23 to rotate (by jet action) about standpipe valve member 17.

As the water level within container 13 increases, float member 27 rides higher and higher and raises sleeve valve member 25. This reduces the alignment between groove 35 and interface openings 43, thereby lessening the flow of the water from tubular members 39. Should the water level still continue to increase, groove 35 and interface openings 43 will altogether fail to register and flow from standpipe valve member 17 will be stopped.

The triangular design of openings 43 in body member 41 (which feature has already been noted) is functional, though not critical, with respect to the present invention. Thus, as the water level rises, triangular openings 45 geometrically decrease the correspondence between groove 35 and tubular members 41. Conversely, when the water level is dropping toward the desired operational level, triangular openings 45 cause the output flow from tubular members 41 to increase in proportion to the area of triangular openings 45 exposed to groove 35. This provides a continuous flow control means which provides the most flow as it is needed (i.e., when the actual water level is farthest from the preselected operating level).

One further aspect of the present invention warrants special emphasis. The rotation of float member 27 agitates and mixes the water deposited in container 13. This stirring action has the effect of releasing residual gas trapped in the water which otherwise would go undetected. Also, rotating action is most important for smooth operation and keeps standpipe valve member 17 and sleeve valve member 23 from sticking or "freezing."

What is claimed is:
1. A gas separator for removing gaseous components from water comprising
   (a) a breakout chamber,
   (b) a gas-water inlet means connected to said chamber terminating as a vertically disposed standpipe having a groove formed about its circumference and communicating passageways between the interior of said standpipe and said groove,
   (c) a sleeve valve slidably mounted on said standpipe and rotatable about same for controlling flow from said groove which valve has radially extending tubular members through which said flow is discharged into said chamber,
   (d) a float responsive to the level of water in said chamber and fixedly attached to said valve for moving same upward and downward on said standpipe thereby adjusting said flow to maintain a predetermined water level,
   (e) a gas outlet means connected to said chamber, and
   (f) a water outlet means connected to said chamber.

2. A gas separator according to claim 1 where said standpipe has beveled edges on its outer surface.

3. A gas separator according to claim 1 where said inlet means includes a stop member which prevents further downward movement of said valve when said valve is fully open.

4. A gas separator according to claim 1 where said gas outlet means includes means for condensing water vapor.

5. A gas separator according to claim 1 where said tubular members lie in a plane perpendicular to said standpipe and are bent so as to cause said valve to rotate about said standpipe by flow reaction.

6. A gas separator according to claim 1 where said valve has triangular openings communicating with said tubular members which said openings are arranged to geometrically decrease correspondence with said groove as the water level rises.

References Cited by the Examiner

UNITED STATES PATENTS

| | | | |
|---|---|---|---|
| 2,428,045 | 9/1947 | Sharp et al. | 55—165 |
| 3,116,133 | 12/1963 | Gates | 55—167 |

REUBEN FRIEDMAN, *Primary Examiner.*

J. W. ADEE, *Assistant Examiner.*